May 17, 1932. P. T. BYNUM 1,858,355
AUTOMOBILE RACK
Filed July 11, 1929 3 Sheets-Sheet 3
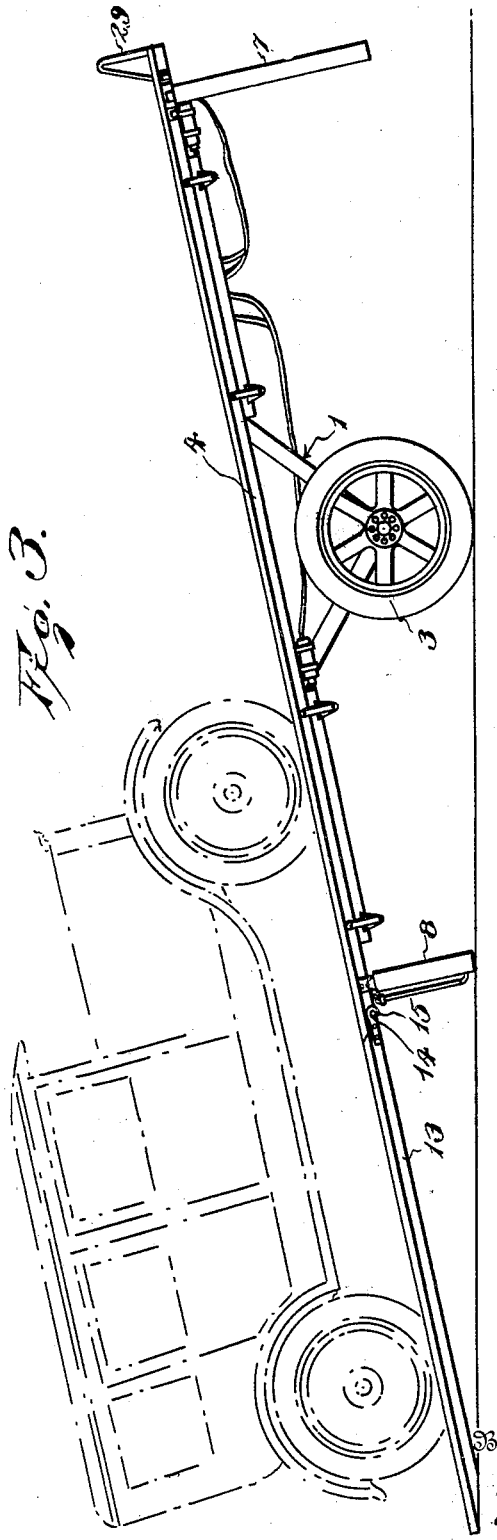
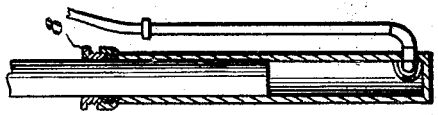
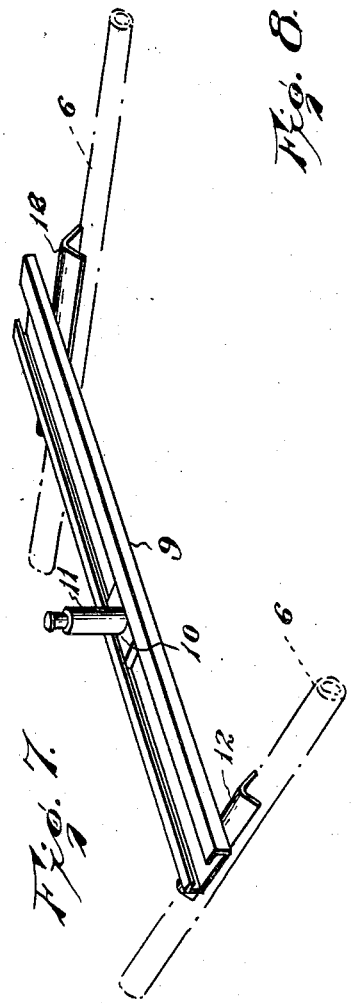
Inventor
P. T. Bynum
By Lacey & Lacey, Attorneys Patented May 17, 1932

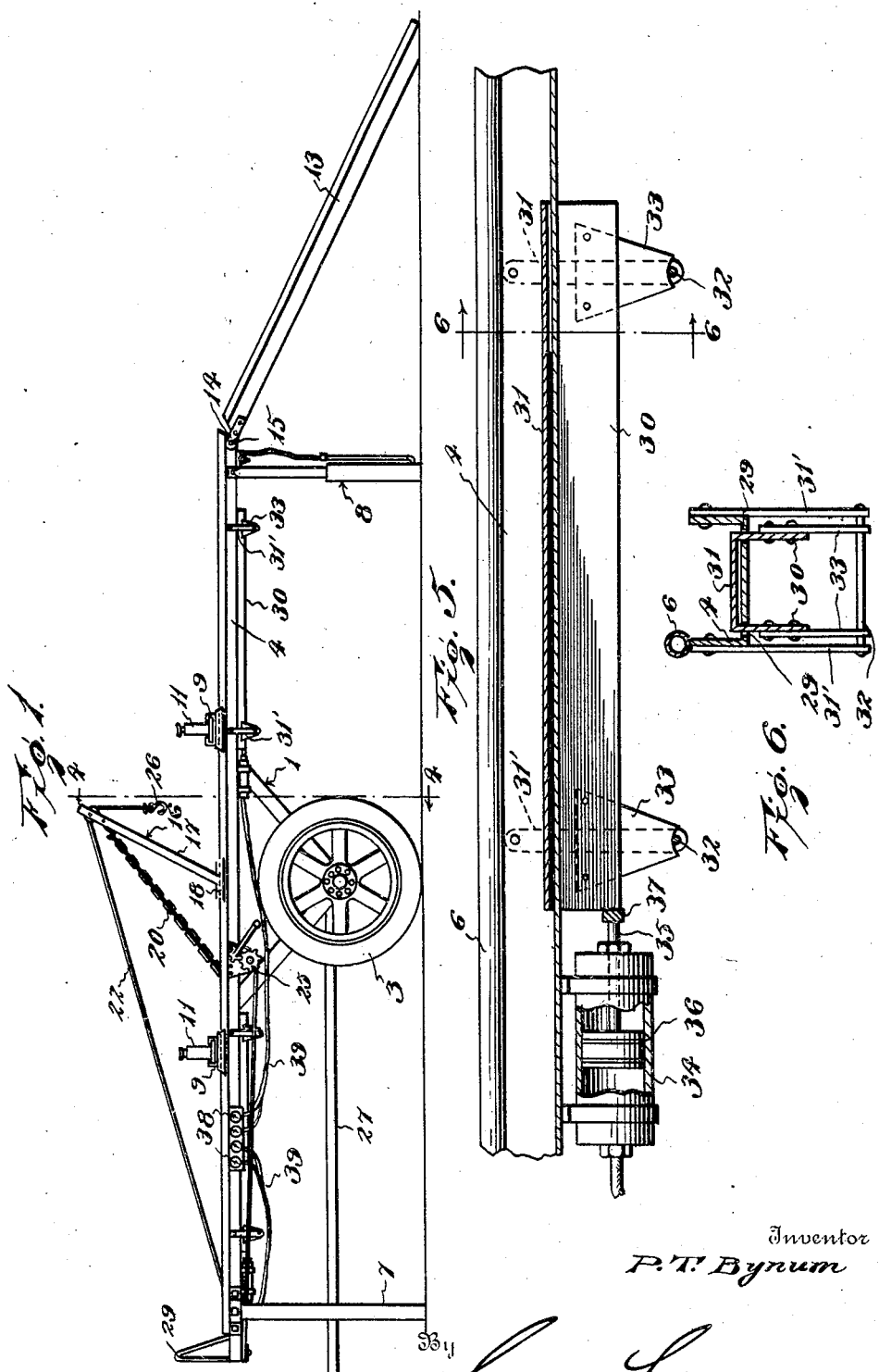

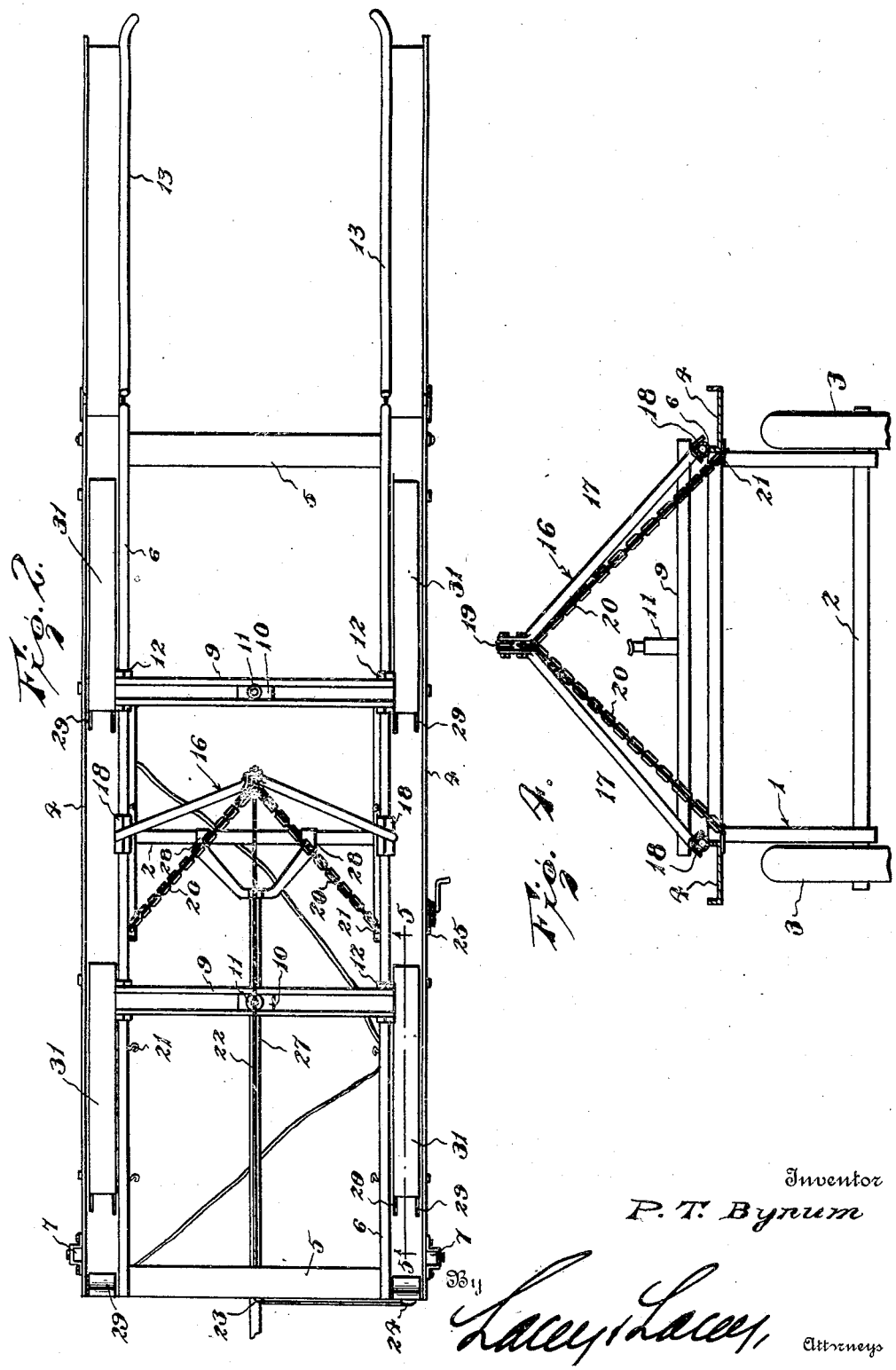

1,858,355

UNITED STATES PATENT OFFICE

PINK T. BYNUM, OF CALLIHAM, TEXAS

AUTOMOBILE RACK

Application filed July 11, 1929. Serial No. 377,535.

The present invention is directed to improvements in automobile racks.

The primary object of the invention is to provide a device of this character so constructed that a vehicle can be driven thereon and maintained in an elevated position in order that the vehicle can be conveniently greased, washed, and repairs and adjustments made from beneath the vehicle.

Another object of the invention is to provide a rack so constructed that it can be employed for towing disabled vehicles.

Another object of the invention is to provide a device of this character so constructed that it can be maintained in an inclined position and the vehicle driven or drawn thereon, after which the rack will tilt to assume a horizontal position.

Another object of the invention is to provide a rack of this character having combined therewith a brake testing mechanism.

With these and other objects in view, this invention resides in the novel features of construction, formation, combination and arrangement of parts to be hereinafter more fully described, claimed and illustrated in the accompanying drawings, in which:

Figure 1 is a side view showing the invention in a horizontal position and the track sections connected therewith.

Figure 2 is a top plan view.

Figure 3 is a side elevation showing the rack in an inclined position.

Figure 4 is a transverse sectional view, on the line 4—4 of Figure 1.

Figure 5 is a sectional view on line 5—5 of Figure 2.

Figure 6 is a sectional view on the line 6—6 of Figure 5.

Figure 7 is a perspective view of one of the jack supporting bars.

Figure 8 is a detail sectional view of one of the hydraulic supporting legs.

The rack comprises a frame 1 having engaged therewith the axle 2 upon which are the wheels 3. Supported upon the frame 1 are paired channel bars 4 connected at their ends by cross bars 5 which serve to maintain the channel bars in spaced parallel relation. The upper sides of the bars 4 at their inner edges are provided with tubular tracks 6, the purpose of which will be later explained.

The forward ends of the bars 4 have removably connected thereto legs 7 while the rear ends thereof are provided with hydraulically controlled legs 8. Obviously, when the legs 7 and 8 are in their operative position, the rack will be supported horizontally and held against tilting.

Slidable longitudinally of the bars 4 is a pair of cross channel bars 9 in which are slidably adjustable the rectangular bases 10 of the screw jacks 11, which are of conventional form and are employed to raise the front or rear of the vehicle when desired, or may be used for holding the car against accidental rolling upon the track.

The ends of the bars 9 are provided with slides 12 which engage the tracks 6, as clearly shown in Figure 7 of the drawings. Since the cross bars 9 are adjustable longitudinally of the side bars 4 and the jacks 11 are adjustable transversely with respect to the side bars, said jacks can be used in connection with cars of various sizes.

Track sections 13 are provided and are formed from channel iron, said sections having hooks 14 carried thereby for detachably engaging studs 15 carried by the bars 4. The meeting ends of the track sections 13 and bars 4 are beveled so that when the rack is in an inclined position, the sections will be held firmly interlocked with the bars 4. It will be apparent that when the rack is tilted, the vehicle can be drawn or driven upon the sections 13 and onto the bars 4.

An inverted V-shaped frame 16 is provided and has its legs 17 provided with slides 18 which, like the slides 12, slide upon the track 6. This frame carries a pulley 19 and also has connected thereto the upper ends of the chains 20 the lower ends of which are adapted to selectively engage the hooks 21 carried by the bars 4, said chains serving to hold the frame 16 in adjusted position upon the bars. Trained over the pulley 19 is a cable 22 which is guided by pulleys 23 and 24 carried by the rack. This cable has one end secured to the windlass 25 suitably mounted upon the rack and has its other end provided with a hook 26 adapted to be connected with a part of the vehicle in order that the same can be pulled or drawn upon the rack. It will, of course, be understood that this cable is only used when the vehicle cannot be driven upon the rack under its own power.

A tongue 27 is provided and has one end formed with a hook 28 adapted to detachably engage the axle 2 when the rack is being used for towing a disabled vehicle. This tongue may be secured to the towing vehicle in any suitable manner. When the rack is used for towing, the legs 7 are, of course, removed and the legs 8 collapsed. The track sections 13 are used only when the track is inclined. Stops 29 are carried by the outer ends of the bars 4 to prevent the vehicle overrunning the same.

Each bar 4 has formed therein slots 29' for slidably receiving the side flanges 30 of the brake testing plates 31, two of which are carried by each bar 4. Having their upper ends pivoted to the sides of the bars 4 are paired hangers 31', the lower ends of which support the cross rods 32 and upon which seat the lower ends of the strips 33, the upper ends of which are rigidly connected to the flanges 30. It will be observed upon reference to Figures 5 and 6, that the plates 31 do not bear upon the bars 4, thus permitting the same to move forwardly when subjected to the drag of the wheels during the testing operation. Since the strips 33 are detachably connected with the rods 32, the plates 31 can be conveniently removed when not in use.

In use, the car is driven upon the rack so that the wheels thereof engage the plates 31, after which the cable 22 is secured to the vehicle in any approved manner and the windlass operated, thus imparting movement to the plates 31 to test the brakes.

Associated with each plate 31 is a cylinder 34 having a piston rod 35 slidable therein and provided with a head 36 movable in the cylinder. The rods are provided with cross heads 37 which abut the adjacent ends of the flanges 30. Grouped upon one side of the rack are pressure gauges 38 and leading thereto from each cylinder 34 is a tube 39. Obviously, when the plates 31 are moved forwardly under the action of the wheels the piston heads will force air to the gauges to obtain readings to denote the condition of the brakes.

From the foregoing, it is thought that the operation and many advantages of the herein described invention will be apparent to those skilled in the art without further description and it will be understood that various changes in size, shape, proportion and minor details of construction may be resorted to without departing from the spirit or sacrificing any of the advantages of the invention.

What is claimed is:

Apparatus for the purpose set forth comprising a wheeled axle, a frame secured to and rising from the axle whereby to rock, parallel channeled side bars carried by said frame and projecting in opposite directions therefrom, cross bars having overhanging flanges along their front and rear edges, slides at the ends of the cross bars spanning the inner side portions of the respective channeled bars, plates slidable upon the respective cross bars and having their edges engaged under the flanges thereon, and jacks carried by said plates.

In testimony whereof I affix my signature.

PINK T. BYNUM. [L. S.]